United States Patent
Kuttner et al.

(10) Patent No.: US 10,166,840 B2
(45) Date of Patent: Jan. 1, 2019

(54) AUXILIARY AIR DISTRIBUTION SYSTEM FOR USE IN A VEHICLE

(71) Applicant: Mahindra Vehicle Manufacturers Limited, Maharashtra (IN)

(72) Inventors: Christoph Kuttner, Ladera Ranch, CA (US); Richard Haas, Dearborn, MI (US); Matthew A. Garrisi, Canton, MI (US); Peter Saglimbene, Shelby Township, MI (US)

(73) Assignee: MAHINDRA VEHICLE MANUFACTURERS LIMITED, Maharashtra (IN)

( * ) Notice: Subject to any disclaimer, the term of this patent is extended or adjusted under 35 U.S.C. 154(b) by 315 days.

(21) Appl. No.: 15/171,654

(22) Filed: Jun. 2, 2016

(65) Prior Publication Data

US 2016/0355070 A1  Dec. 8, 2016

Related U.S. Application Data

(60) Provisional application No. 62/170,343, filed on Jun. 3, 2015.

(51) Int. Cl.
*B60H 1/00*   (2006.01)
*B60H 1/24*   (2006.01)
*B60H 1/34*   (2006.01)

(52) U.S. Cl.
CPC ............. *B60H 1/244* (2013.01); *B60H 1/245* (2013.01); *B60H 1/247* (2013.01); *B60H 1/3407* (2013.01); *B60H 1/3414* (2013.01)

(58) Field of Classification Search
CPC ........ B60H 1/247; B60H 1/244; B60H 1/245; B60H 1/3407; B60H 1/3414; B60H 2001/00235; F24F 7/02; F24F 7/00

(Continued)

(56) References Cited

U.S. PATENT DOCUMENTS 4,252,053 A * 2/1981 Muto ................. B60H 1/247
                                                    454/137
6,302,780 B1 * 10/2001 Ahn ................... B60H 1/00371
                                                    454/136

(Continued)

FOREIGN PATENT DOCUMENTS

DE          9116338 U1     10/1992
JP          2007022311 A    2/2007
WO      WO2010150333 A1    12/2010

OTHER PUBLICATIONS

International Search Report and Written Opinion dated Oct. 12, 2016 from corresponding International Patent Application No. PCT/US2016/035715.

*Primary Examiner* — Gregory Huson
*Assistant Examiner* — Ryan Faulkner
(74) *Attorney, Agent, or Firm* — Dickinson Wright PLLC

(57) ABSTRACT

An air distribution system for the distribution of air to a rear portion of a vehicle includes a housing extending between a first and second end. The housing defines a plurality of first direct air outlets disposed adjacent the first end, a plurality of second direct air outlets disposed adjacent the second end, and a plurality of indirect air outlets disposed between the first and second direct air outlets. An airflow control assembly is configured to interchange airflow of the air distribution system between a first mode in which airflow is open through the direct air outlets but blocked from the indirect air outlets for guiding air directly to occupants situated in the rear portion of the vehicle and a second mode in which airflow is restricted through the direct air outlets and open through the indirect air outlets to create a bloom of air over the rear vehicle occupants.

17 Claims, 13 Drawing Sheets

(58) Field of Classification Search
USPC ....... 454/292, 137, 138, 154, 155, 136, 107,
454/108, 109, 221, 222, 277, 278, 279,
454/280, 281, 282, 283, 309, 347, 358;
74/471, 469
See application file for complete search history.

(56) References Cited

U.S. PATENT DOCUMENTS

| | | | |
|---|---|---|---|
| 6,599,182 B1* | 7/2003 | Schwarz | B60H 1/00842 |
| | | | 454/152 |
| 6,616,523 B1* | 9/2003 | Tani | B60H 1/247 |
| | | | 454/137 |
| 9,168,810 B2 | 10/2015 | Ghosh et al. | |
| 2013/0157557 A1* | 6/2013 | Malott | F24F 13/06 |
| | | | 454/292 |

\* cited by examiner

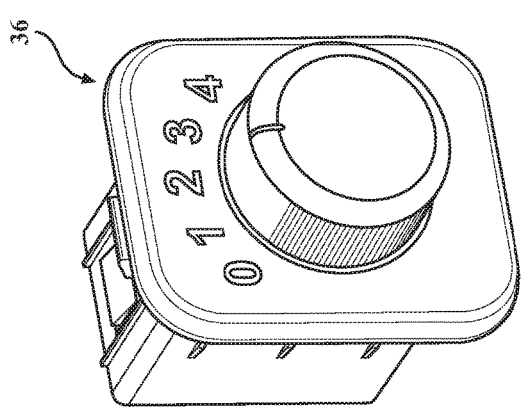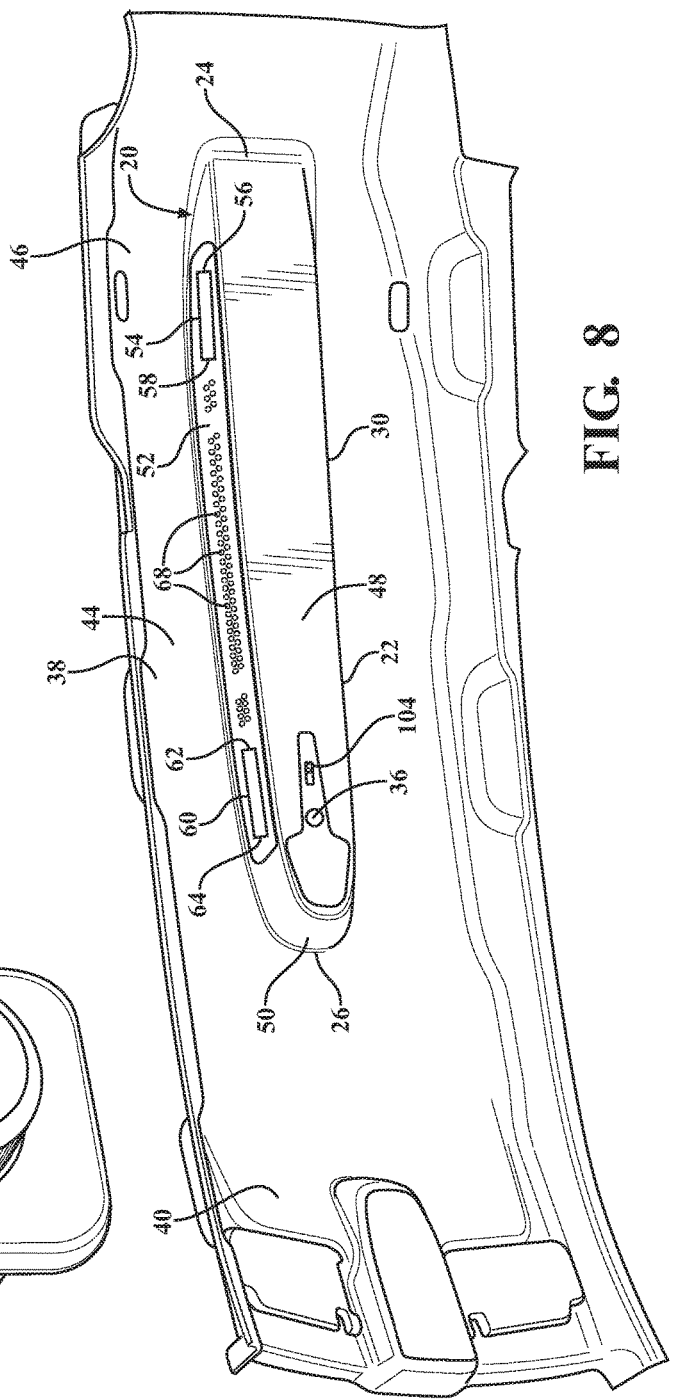

US 10,166,840 B2

AUXILIARY AIR DISTRIBUTION SYSTEM FOR USE IN A VEHICLE

CROSS REFERENCE TO RELATED APPLICATION

The subject application claims priority to U.S. Provisional Application Ser. No. 62/170,343 filed on Jun. 3, 2015 and entitled a "Headliner Air Distribution System", the entire disclosure of which is incorporated herein by reference.

FIELD OF THE INVENTION

The subject disclosure relates in general to air distribution systems in vehicles. More specifically, the subject disclosure relates to an air distribution system for the distribution of air conditioning to second and third row passengers of a vehicle.

BACKGROUND OF THE INVENTION

Many multi-passenger vehicles, such as vans, mini-vans, station wagons or SUVs, have second and third row seating. Air conditioning for passengers sitting in these second and third rows is typically provided by an additional rear air conditioning unit that directs airflow to direct air outlets which are positioned to guide airflow directly toward where the occupants would be seated in the second and third rows. This is typically accomplished with air outlets integrated into the headliner and ducting from the rear quarter side of the vehicle. One such example is disclosed in U.S. Pat. No. 9,168,810 to Delphi Technologies.

During an initial cool down, cold air is directed from the outlets to typical positions where the occupants would be seated in the second and third rows. However, once the initial cool down is completed, this airflow of the cold air moving directly to where the passengers are seated can be felt as a draft and can be subjectively uncomfortable for the occupants. Accordingly, a continuing need exists to provide an air distribution system which provides for the desired initial cool down, but thereafter continues to provide airflow in a more comfortable manner for the occupants situated in the second and third row seating.

SUMMARY OF THE INVENTION

An air distribution system for the distribution of air conditioning to a rear portion of a vehicle includes a housing extending from a first end to a second end. The housing defines a plurality of first direct air outlets disposed adjacent the first end, a plurality of second direct air outlets disposed adjacent the second end, and a plurality of indirect air outlets disposed between the plurality of first direct air outlets and the plurality of second direct air outlets. An airflow control assembly is configured to interchange airflow of the air distribution system between a first, or direct, airflow mode and a second, or indirect, airflow mode. In the first mode, airflow is open through the plurality of first and second direct air outlets but blocked from the plurality of indirect air outlets for guiding air directly to occupants situated in the rear portion of the vehicle. In the second mode, airflow is restricted through the plurality of first and second direct air outlets and open through the plurality of indirect air outlets for creating a bloom of air over the occupants of the rear portion of the vehicle. Such an arrangement of airflow in the second mode provides for a subjectively more comfortable airflow for the occupants situated in the second and third row seating after an initial cooldown is completed than achievable via those systems which rely solely on direct airflow outlets for conditioning a vehicle.

BRIEF DESCRIPTION OF THE DRAWINGS

The drawings described herein are for illustrative purposes only of selected embodiments and are not intended to limit the scope of the present disclosure. The inventive concepts associated with the present disclosure will be more readily understood by reference to the following description in combination with the accompanying drawings wherein:

FIG. 7 is a perspective view of the fan switch of the air distribution system;

FIG. 8 is a perspective view of a second arrangement of an air distribution system integrated within the headliner of the vehicle;

DETAILED DESCRIPTION OF THE ENABLING EMBODIMENTS

Figure 1:
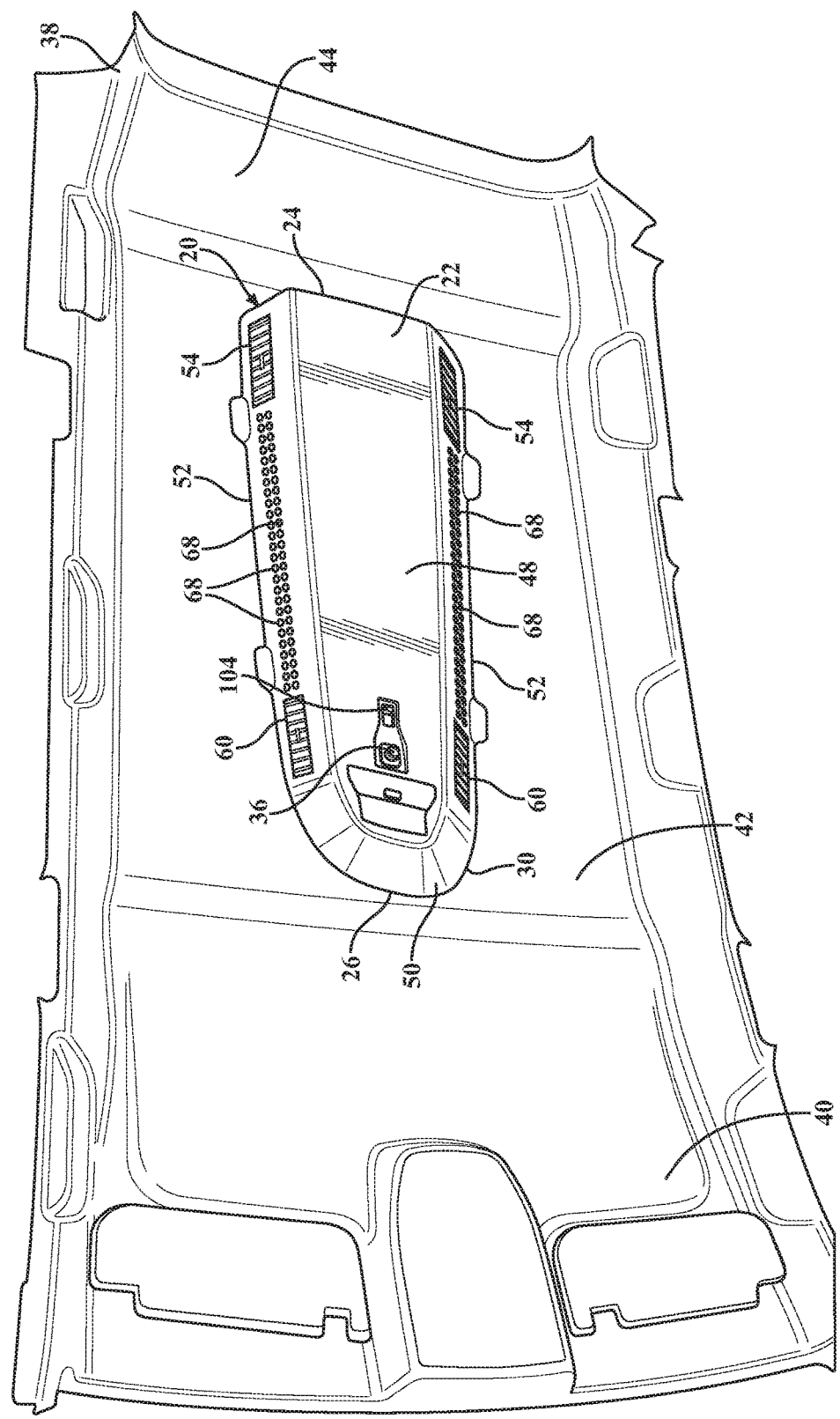
FIG. 1 is a perspective view of a first arrangement of an air distribution system attached to a headliner of a vehicle.

While the invention may be susceptible to embodiment in different forms, there is shown in the drawings, and herein will be described in detail, specific preferred embodiments with the understanding that the present disclosure is to be considered an exemplification of the principles of the invention, and is not intended to limit the invention to that as illustrated and described herein. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Figure 2:
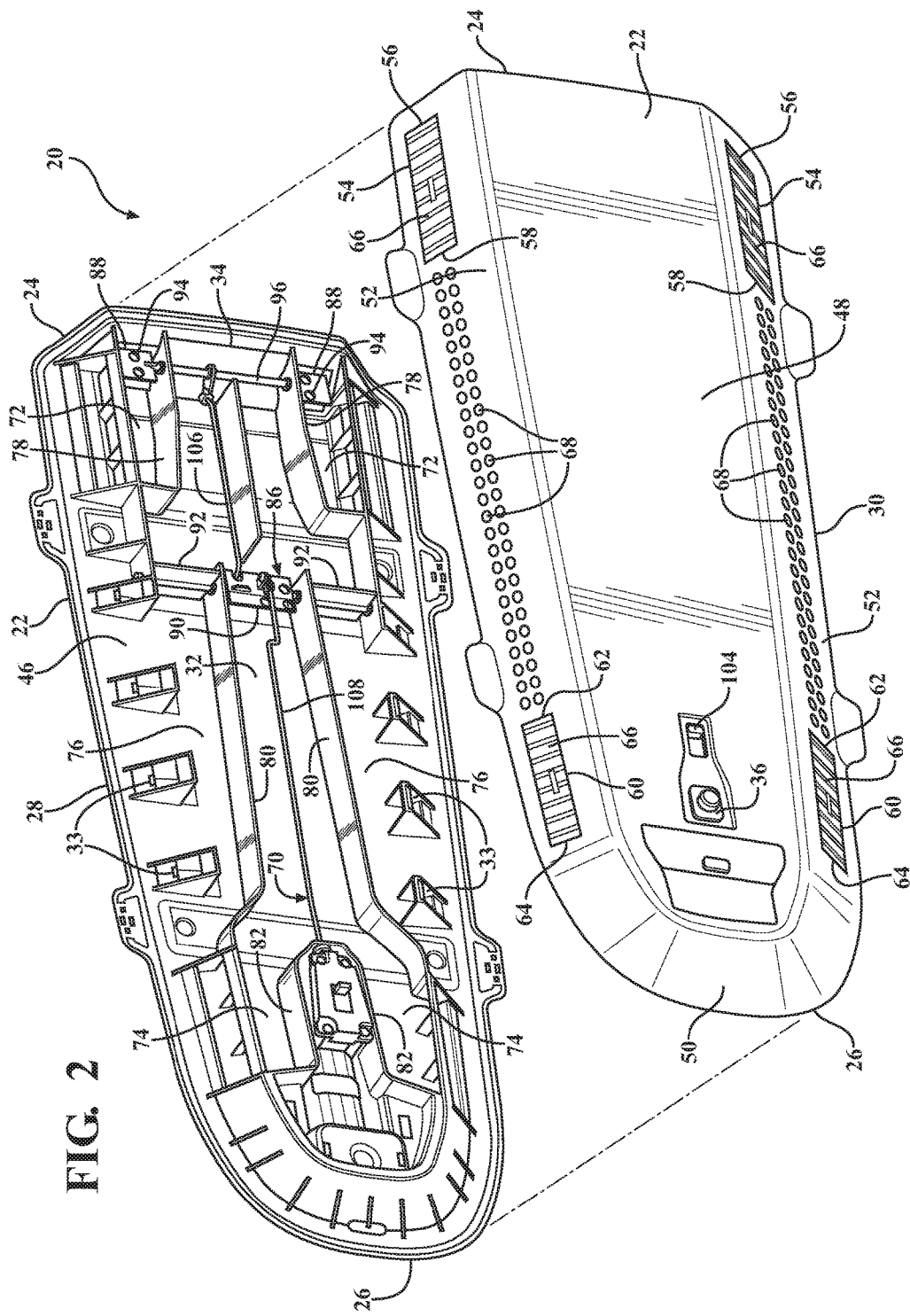
FIG. 2 is an exploded perspective view of the air distribution system of FIG. 1 illustrating a housing of the air distribution system having an upper panel and a lower panel each extending from a first end to a second end.
Figure 9:
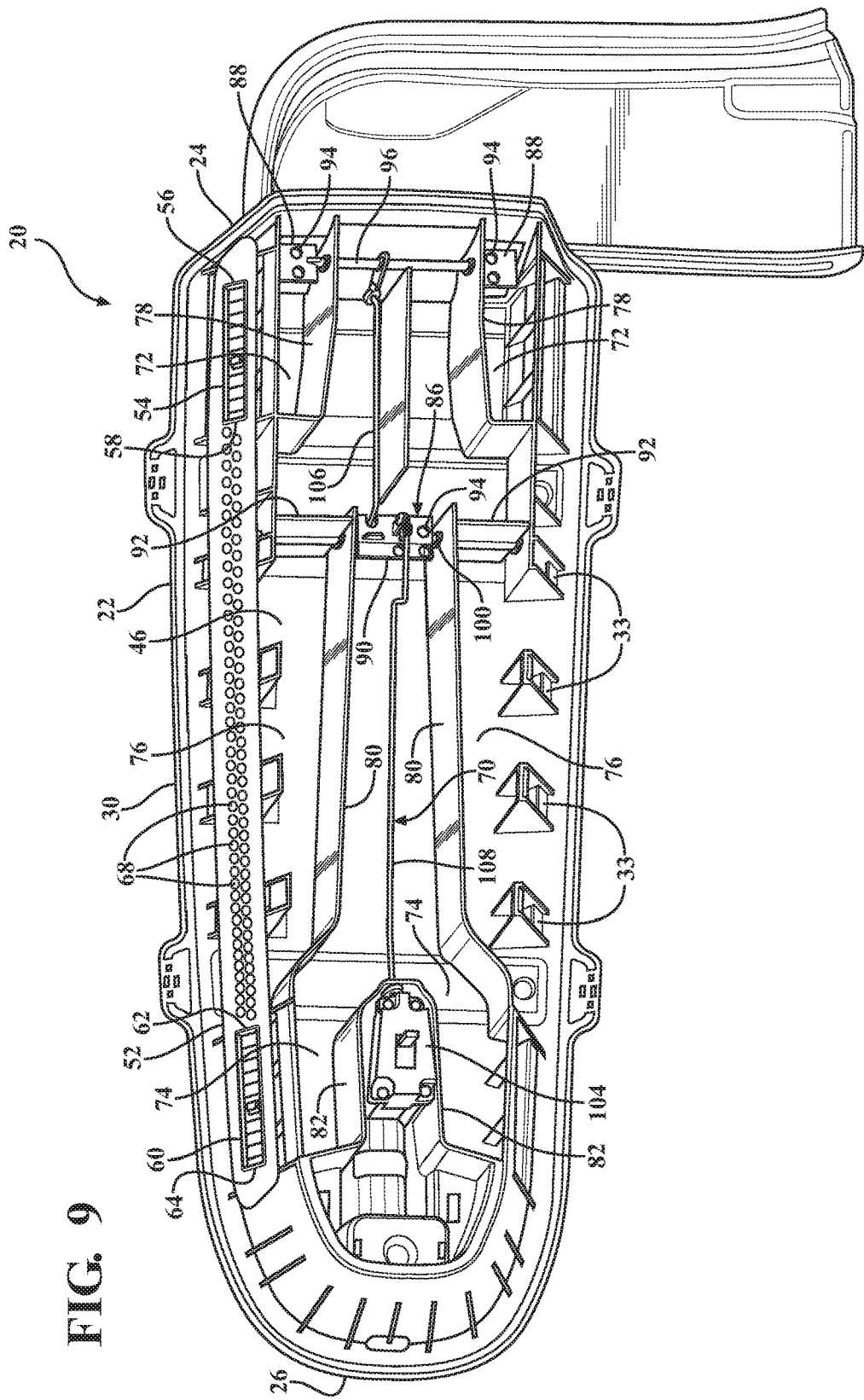
FIG. 9 is a bottom view of the upper panel illustrating the airflow switch operatively connected to an air blocking device of the air distribution system.
Figure 10:
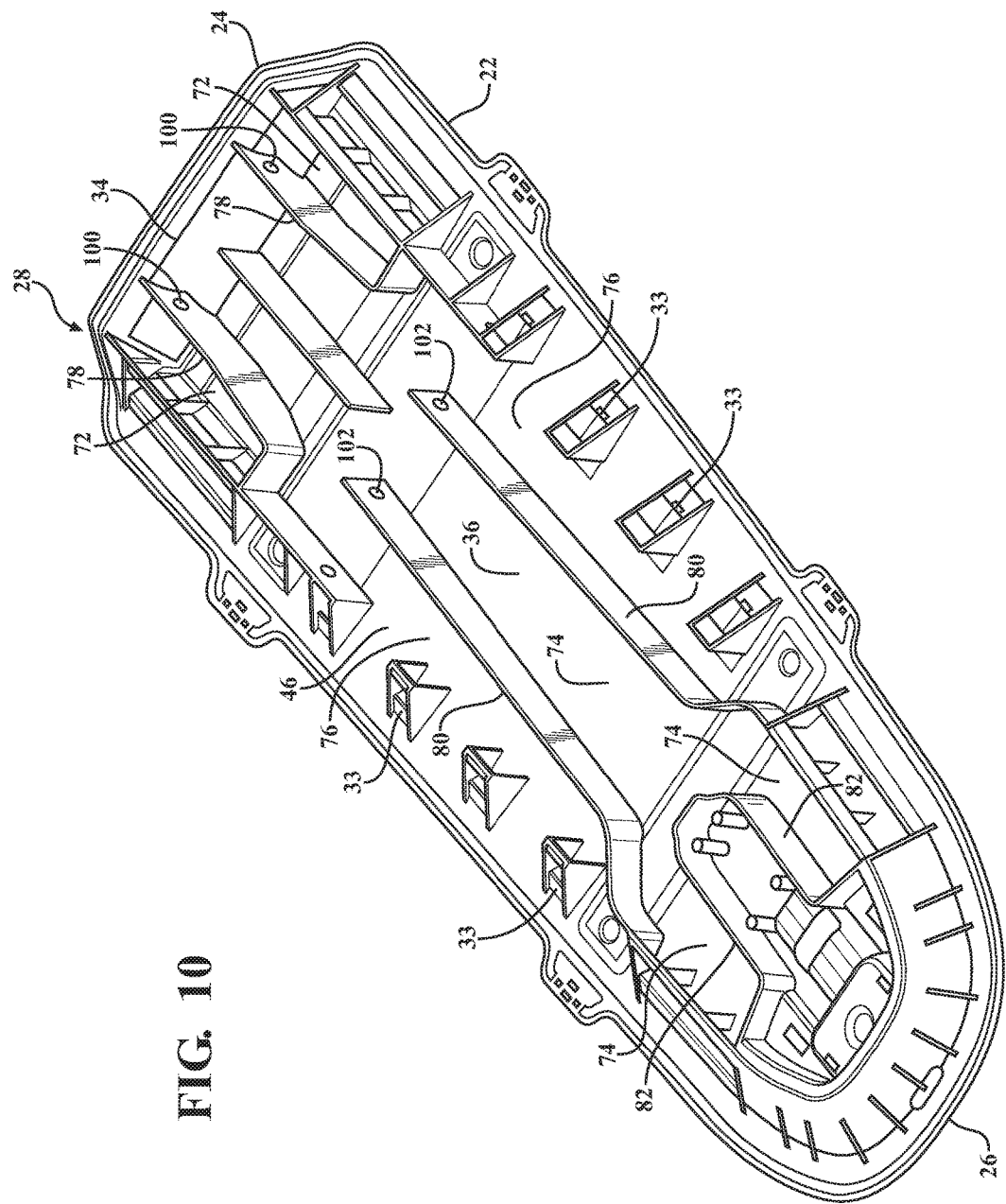
FIG. 10 is a bottom view of the upper panel illustrating a plurality of ribs extending downwardly from a top portion to define a plurality of direct airflow channels, a plurality of indirect airflow channels, and a plurality of first and second slots for supporting the air blocking device.

Referring to the Figures, wherein like numerals indicate corresponding parts throughout the several views, an auxiliary air-conditioning (AC) air distribution system 20 for distributing air conditioning to a rear portion of a vehicle, such as the second and third rows of the vehicle, is generally shown. The air distribution system 20 includes a housing 22 which extends from a first, or rearward, end 24 to a second, or frontward, end 26. The housing 22 includes an upper panel 28 and a lower panel 30 which are interconnected and disposed in spaced relationship with one another to define an open space 32 extending there between. As best illustrated in FIGS. 2, 9, and 10, the lower and upper panels 28, 30 can be snapped together using a plurality of clips 33 to establish the interconnected relationship. However, other means of interconnecting the upper and lower panels 28, 30 can be utilized without departing from the subject disclosure. The lower panel 30 of the housing 22 defines an air inlet 34 disposed at the first end 24 for establishing communication with a rear air conditioning unit (not shown) of the vehicle, the structure, function and operation of which are generally known in the art. The rear air conditioning unit is preferably positioned rearward of the third row of seating and provides a flow of air to the air inlet 34 of the air distribution system 20 for distribution to the second and third rows of the vehicle.

Figure 3:
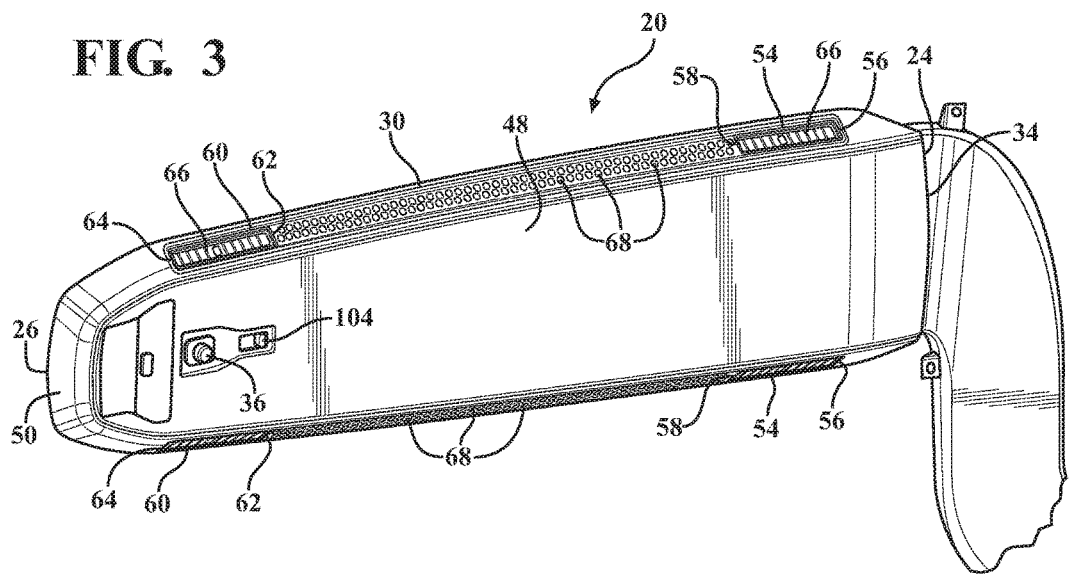
FIG. 3 is a perspective view of the air distribution system illustrating a first pair of direct air outlets disposed adjacent the first end, a second pair of direct air outlets disposed adjacent the second end, and a plurality of indirect air outlets disposed between the first and second pair of direct air outlets.
Figure 4:
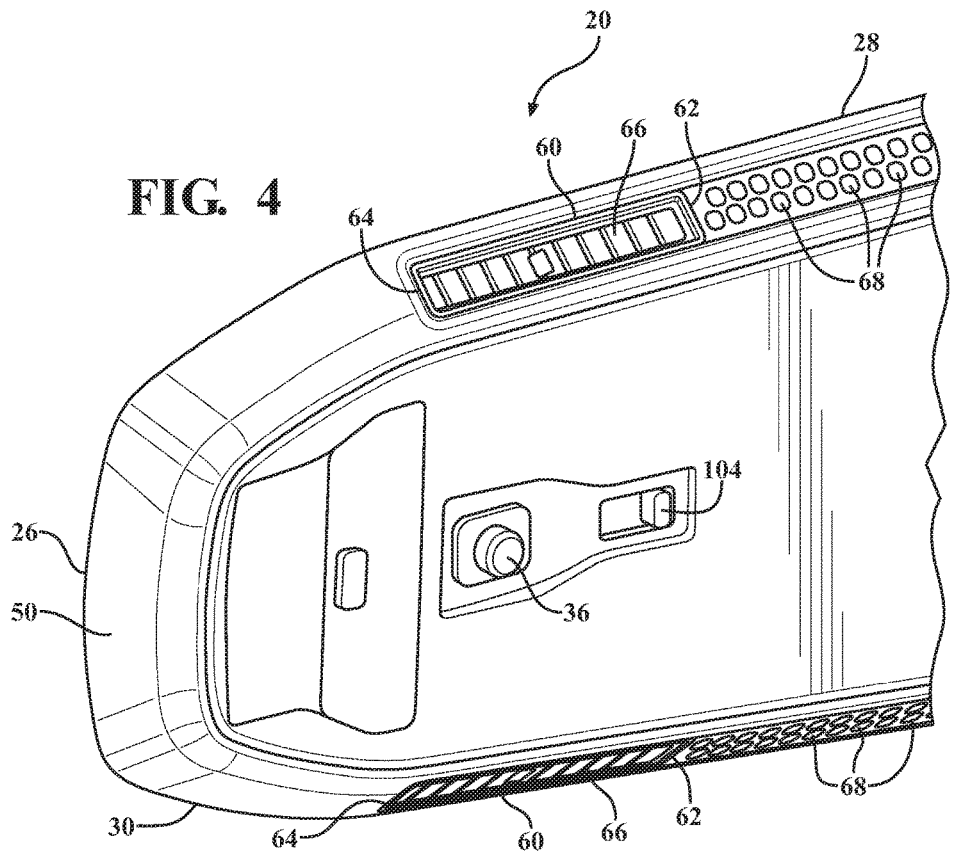
FIG. 4 is a fragmentary, perspective view of the air distribution system illustrating a fan switch and an air flow switch disposed on the lower panel.
Figure 5:
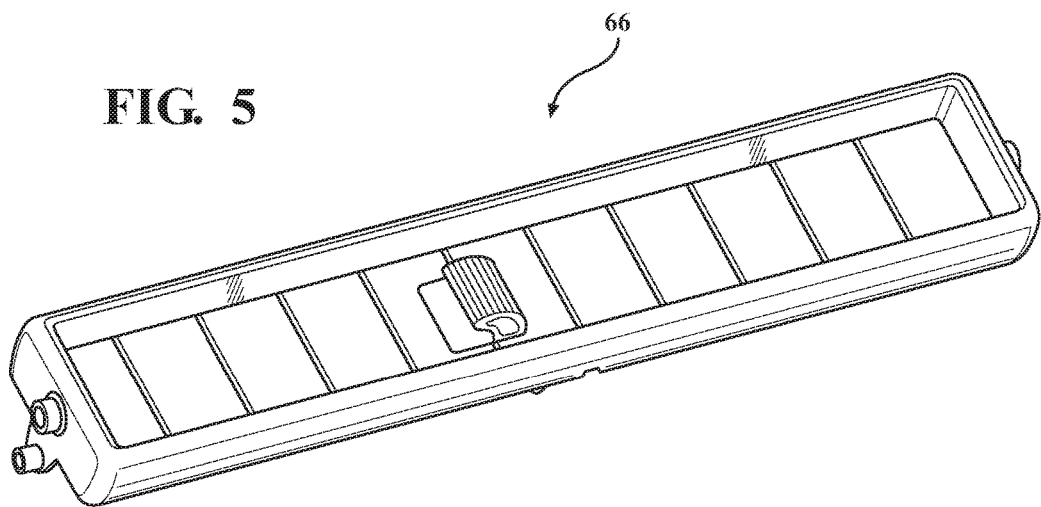
FIG. 5 is a perspective view of an exemplary vent for covering the first and second pair of direct air outlets of the air distribution system.
Figure 6:
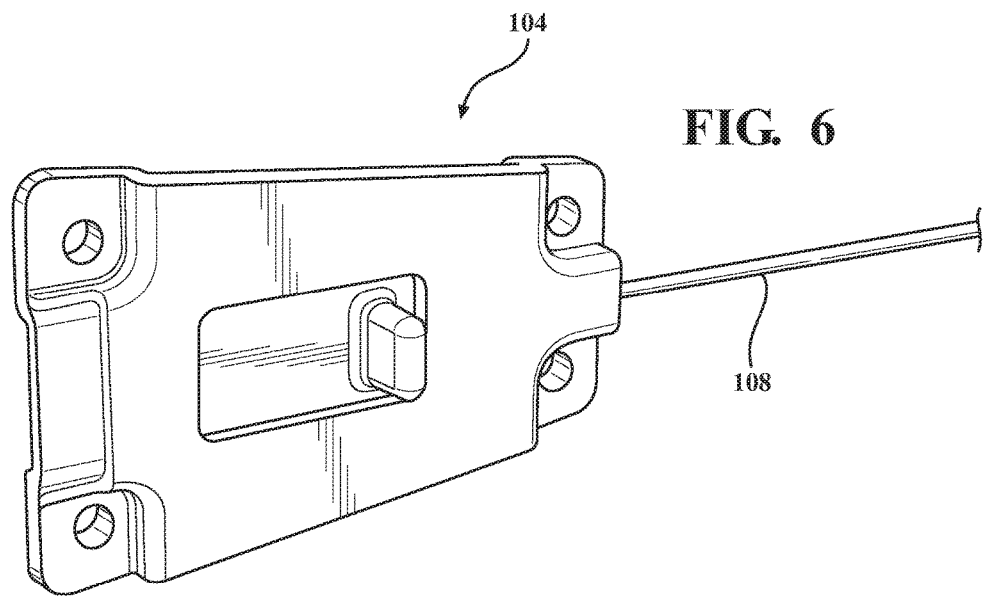
FIG. 6 is a perspective view of the airflow switch interconnected to a rod and configured to be movable between a first position and a second position.

As best illustrated in FIGS. 3 and 4, a fan switch 36 can be positioned or disposed on the lower panel 30 adjacent the second end 26, preferably above the second row of seating in the vehicle. The fan switch 36 is in electrical communication with the rear air conditioning unit to control a volume of airflow from the rear air conditioning unit to the air inlet 34 of the air distribution system 20. As best illustrated in FIG. 5, in a preferred arrangement, the fan switch 36 is movable between at least three positions. In the first position, the fan switch 36 is in an "off" position, such that the rear air conditioning unit is not operating, and such that air is not moving or flowing through the air distribution system 20. The second and other positions of the fan switch 36 effectuate control of the fan speed of the rear air conditioning unit to sequentially deliver a higher volume of air to the air distribution system 20 with each consecutive position.

As best illustrated in FIGS. 1 and 8, the air-conditioning (AC) air distribution system 20 is operatively associated with a headliner 38 of the vehicle, such as the exemplary headliner 38 generally illustrated in FIGS. 1 and 8 which is designed for use with a vehicle having three rows of seating. The headliner 38 has a forward section 40 which is generally provided above the first row of seating in the vehicle, e.g., where the driver of the vehicle is seated, and a middle section 42 and a rearward section 44. The middle section 42 is generally provided above the second row of seating in the vehicle and the rearward section 44 is generally provided above the third row of seating in the vehicle. However, the headliner 38 may have any configuration desired so as to match the configuration of the associated vehicle without departing from the scope of the disclosure.

As best illustrated in FIG. 1, in one arrangement the air distribution system 20 is attached to the headliner 38. However as best illustrated in FIG. 8, in another arrangement the air distribution system 20 is integrated within or covered by the headliner 38 such that the headliner 38 defines or comprises the lower panel 30 of the housing 22. In either arrangement, the AC air distribution 20 system is generally positioned in and extends across the middle and rearward sections 42, 44 of the headliner 38.

As best illustrated in FIGS. 2, 9, and 10, the upper panel 28 has a top portion 46 which is generally flat and configured to be disposed in overlaying relationship with either the headliner 38 or roof panel of the vehicle depending on the arrangement of the air distribution system 20. When the air distribution system 26 is attached directly to the headliner 38, the upper panel 28 is configured to be mounted or otherwise secured in or to the middle and rearward sections 42, 44 of the headliner 38. As best illustrated in FIG. 8, when the AC air distribution system 20 is integrated within or covered by the headliner 38, the upper panel 28 is configured to be mounted or otherwise secured to a roof panel of the vehicle for coverage by or integration within the headliner 38. In either arrangement, and as described above, the first end 24 of the upper panel 28 can be positioned next to a rear air conditioning unit of the vehicle and the lower panel 30 is configured to be secured to the upper panel 28 in such a manner that the lower panel 30 generally covers the upper panel 28 such that an open space 32 is provided between the upper and lower panels 28, 30.

As best illustrated in FIGS. 1, 2, and 8, the lower panel 30 includes a base portion 48 which extends in spaced and generally parallel relationship with the top portion 46 of the upper panel 28. The base portion 48 is also sized and shaped to generally match the configuration of the top portion 46 of the upper panel 28, namely because the base portion 48 covers the top portion 46 when the lower panel 30 is interconnected to the upper panel 28. The lower panel 30 includes a front wall portion 50 disposed at the second end 26 and which extends from the base portion 48 to the top portion 46 of the upper panel 28 when the upper and lower panels 28, 30 are disposed in interconnected relationship to one another. The lower panel 30 also includes a pair of side walls 52 disposed on opposite sides of the base portion 48 and which extend longitudinally between the first and second ends 24, 26 of the housing, 22, i.e., from the front wall portion 50 of the lower panel 30 to the air inlet 34. The pair of side walls 52 also extend upwardly from the base portion 48 to the top portion 46 of the upper panel 28 when the upper and lower panels 28, 30 are disposed in interconnected relationship to one another.

As best illustrated in FIGS. 1-3, 8-9, and 12-13, the pair of side walls 52 of the lower panel 30 define a first pair of direct air outlets 54 disposed adjacent the first end 24 of the housing 22 and each of which extend from a first, rear edge 56 to a first, front edge 58. The pair of side walls 52 also define a second pair of direct air outlets 60 disposed adjacent the second end of the housing 22 and each of which extend from a second, rear edge 62 to a second, front edge 64. Accordingly, each of the side walls 52 define one of the first pair of direct air outlets 54 and one of the second pair of direct air outlets 60 such that the first and second pairs of direct air outlets 54, 60 are disposed on opposite sides of the lower panel 30 and in aligned relationship with one another. Each of the first and second pairs of direct air outlets 54, 60 are preferably rectangular in configuration and covered by vents 66 designed to direct air to the typical positioning of passengers in the second and third row seating.

As best illustrated in FIGS. 1-3, 8-9, and 12-13, the pair of side walls 52 of the lower panel 30 define a plurality of indirect air outlets 68 disposed and spaced between the first and second pair of direct outlets 54, 60. Put another way, each of the side walls 52 define a plurality of indirect air outlets 68 extending therethrough and disposed along opposite sides of the lower panel 30. The plurality of indirect air outlets 68 are positioned such that they are disposed between, and not positioned directly above, passengers situated in the second and third rows of the vehicle. As will be explained in more detail below, the plurality of indirect air outlets 68 provide for air conditioning of the second and third rows of the vehicle via a reduction of airflow velocity that creates a bloom of air above the occupants' heads which slowly settles down on the occupants. Accordingly, such an arrangement provides for a subjectively more comfortable airflow for the occupants situated in the second and third row seating than achievable via those systems which rely solely on direct airflow outlets for conditioning a vehicle.

Figure 12:
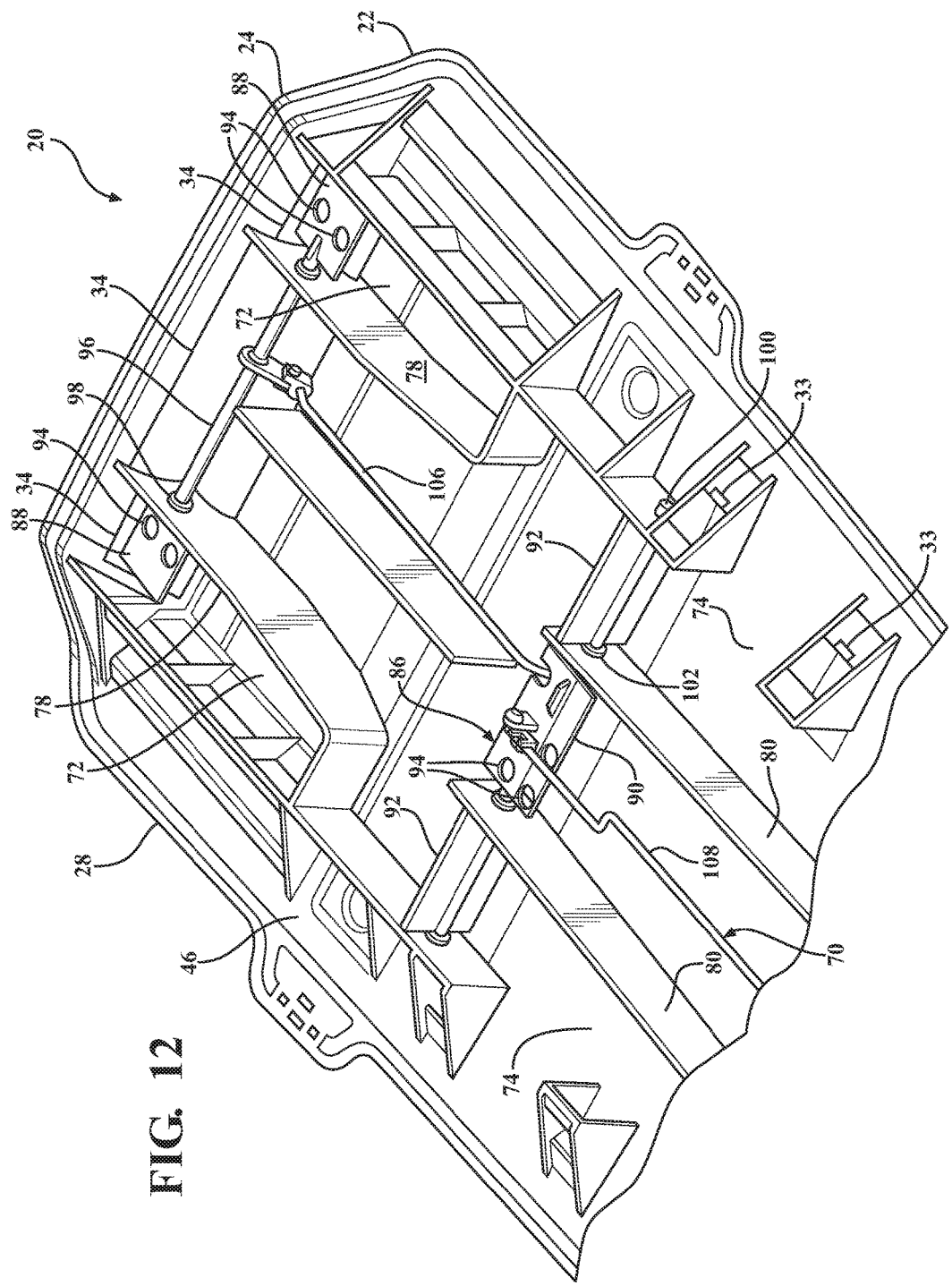
FIG. 12 is a cross-sectional, perspective view of a portion of the air distribution system illustrating the plurality of direct air flaps disposed in an open position and the plurality of indirect air flaps disposed in a closed position to establish a first or "direct" mode of the air distribution system.
Figure 13:
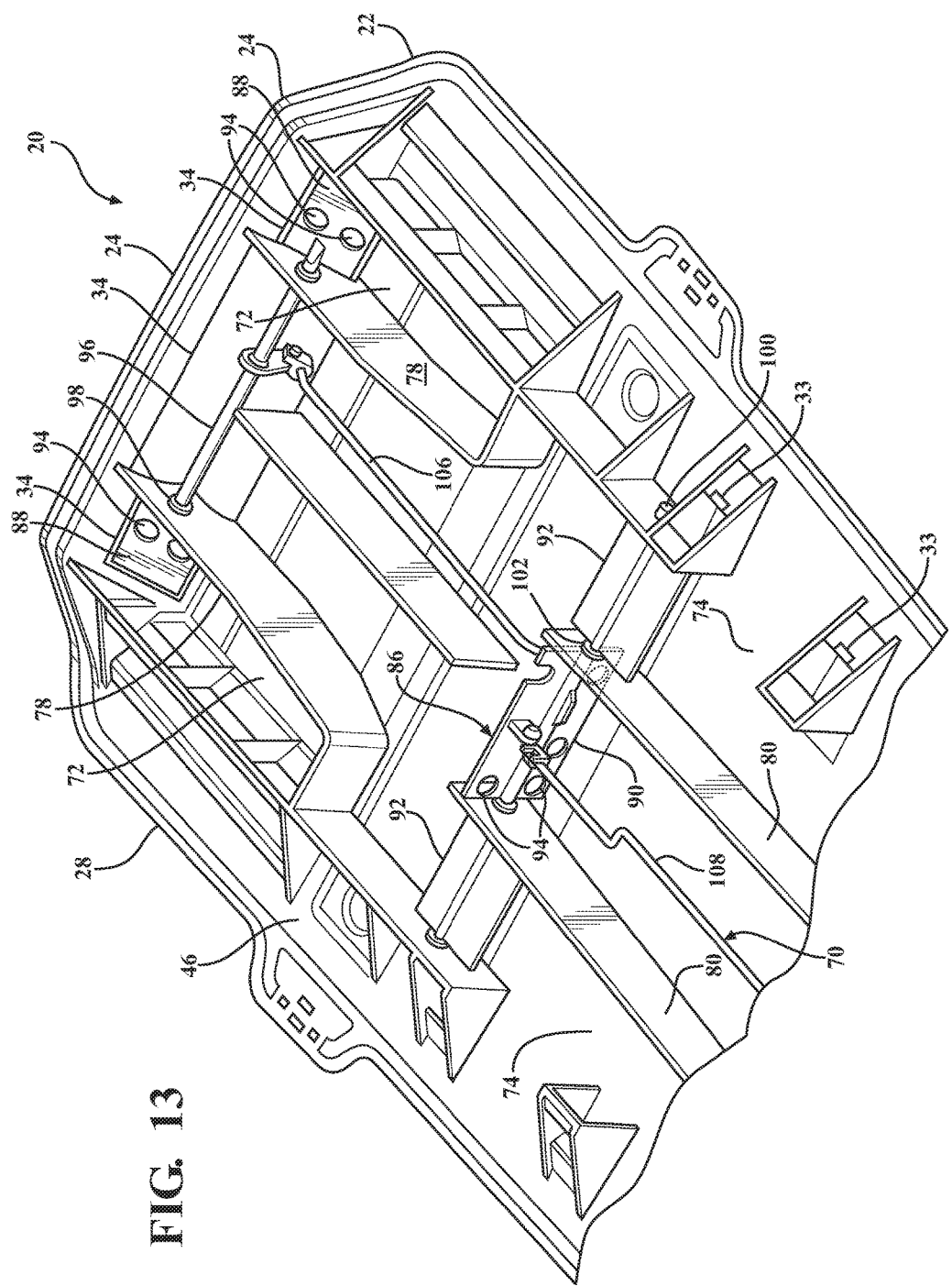
FIG. 13 is a cross-sectional, perspective view of a portion of the air distribution system illustrating the plurality of direct flaps disposed in a restricted position and the plurality of indirect air flaps disposed in an open position to establish a second or "indirect" mode of the air distribution system.
Figure 16:
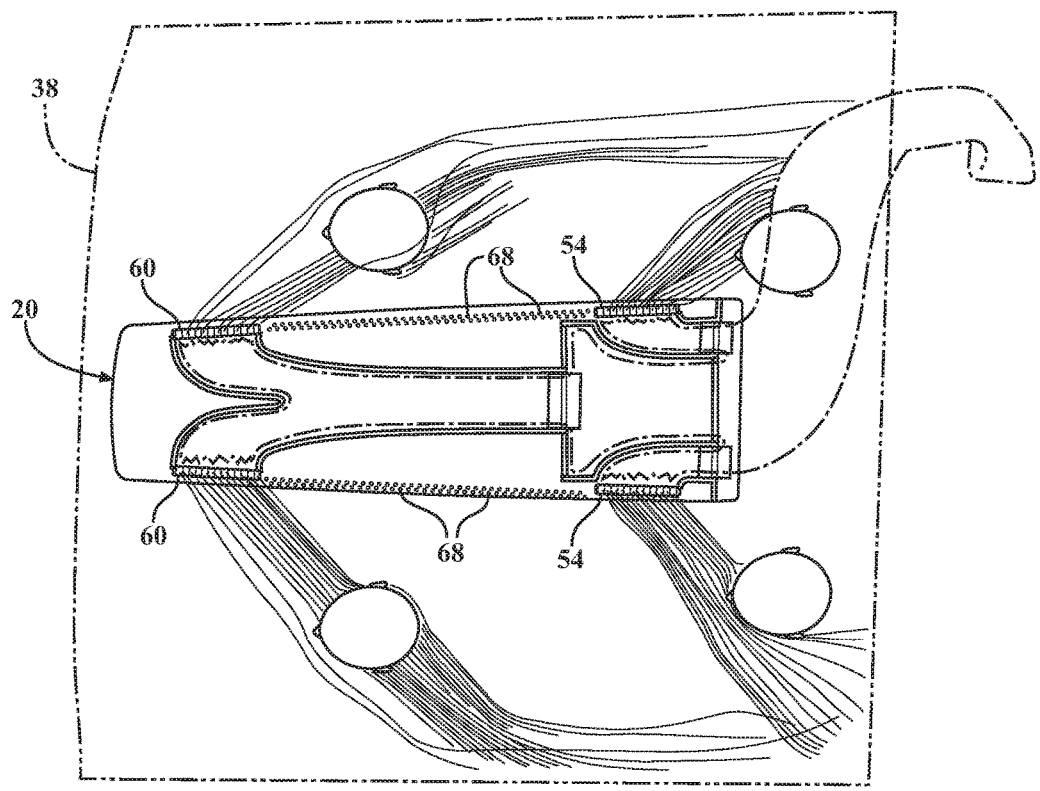
FIG. 16 illustrates an airflow pattern of the air distribution system in the first or "direct" mode in which airflow is guided directly towards occupants situated in in a second and third row seating of the vehicle.
Figure 17:
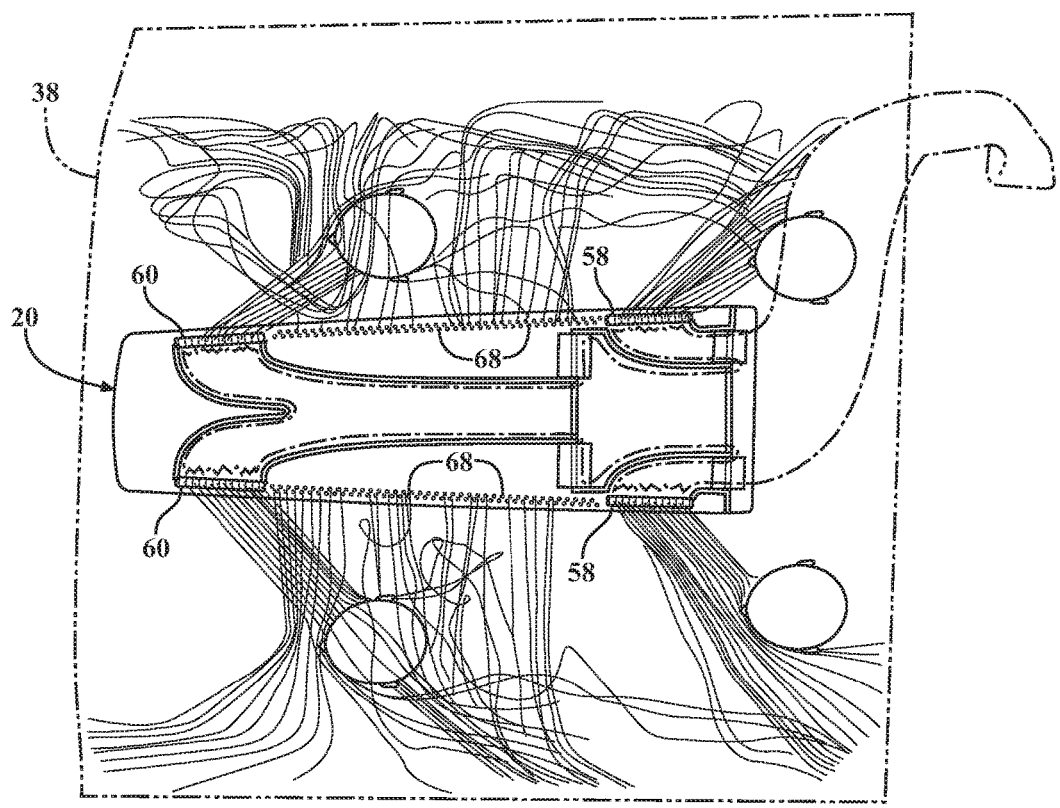
FIG. 17 illustrates an airflow pattern of the air distribution system in the second or "indirect" mode in which a bloom of air is created above the occupants' heads for slowly settling down on the occupants situated in the second and third row seating of the vehicle.

As best illustrated in FIGS. 1, 9, and 12-13, the air distribution system 20 includes an airflow control assembly 70 for interchanging the air distribution system 20 between a "direct" or first airflow mode and an "indirect" or second airflow mode. As illustrated in FIG. 12, in the "direct" or first airflow mode, the air control assembly 70 blocks or prevents airflow out of the plurality of indirect air outlets 68, thus only allowing or guiding airflow out of the first and second pairs of direct air outlets 54, 60. With reference to FIG. 16, in this first or "direct" airflow mode, when the rear air conditioning unit is operating at full fan speed (360 m³/hr), the average velocity of air exiting the direct air outlets 54, 60 is approximately and preferably 6.7 m/s meters/second. As illustrated in FIG. 13, in the "indirect" or second airflow mode, the air control assembly 70 restricts flow out of the first and second pair of direct air outlets 54, 60 and opens airflow through the plurality of indirect air outlets 68 disposed along the opposing longitudinal side walls 52 of the lower panel 30 to establish the bloom of air for slowly setting down on the occupants. With reference to FIG. 17, in the "indirect" or "diffused" second mode, when the rear air conditioning unit is operating at full fan speed (360 m³/hr), the average velocity of air exiting the first and second direct outlets 54, 60 as well as the plurality of indirect air outlets 70 of is approximately and preferably 1.7 meters/second. However, other velocities of airflow could be utilized without departing from the scope of the subject disclosure.

The air distribution system 20 provides a number of benefits over prior art air distribution systems which rely solely on direct air outlets to air condition the second and third rows of a vehicle. Namely, the air distribution system 20 provides the ability to switch airflow from out of only the direct outlets 54, 60 (i.e., the "direct" airflow mode) to airflow out of the indirect air outlets 70 and the direct air outlets 54, 60 (i.e., the "indirect" airflow mode), and therefore allowing for the reduction in the air velocity of cold air and creating a bloom of air above the occupant's head that enhances subjective comfort of the occupants. Stated differently, the ability to switch from "direct" to "indirect" airflow modes by opening additional indirect air outlets 70 is desirable and beneficial to the comfort of passengers sitting in the second and third row seating. At present, headliner AC airflow distribution systems which rely solely on direct air outlets can only reduce the velocity of the airflow out of these direct air outlets by reducing the fan speed of the rear air conditioning unit.

Figure 14:
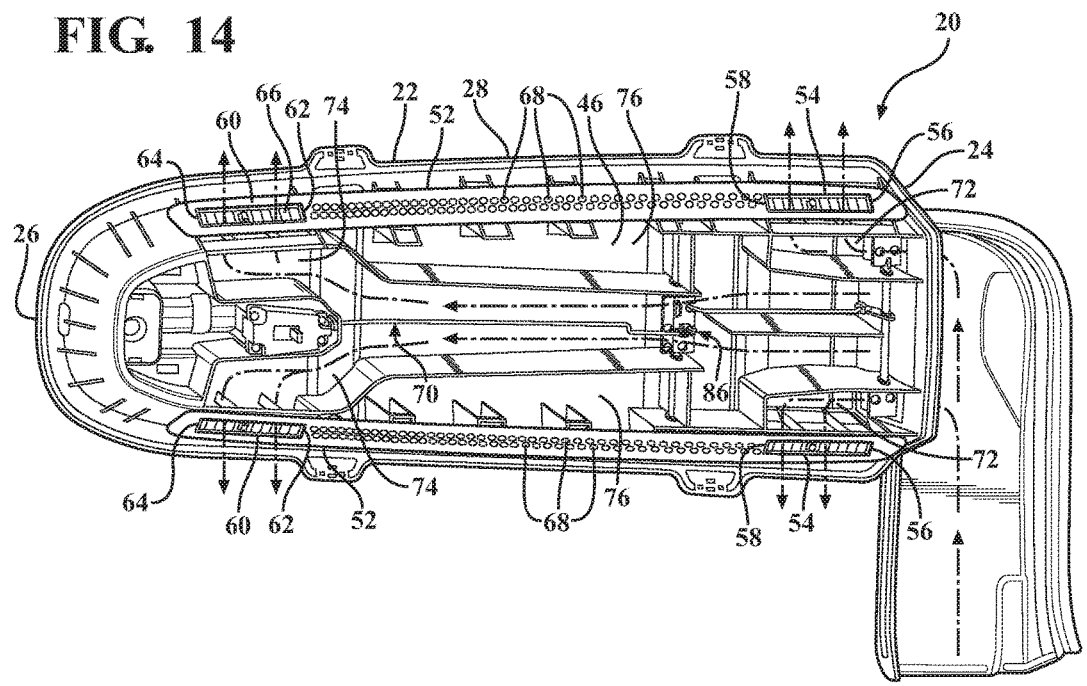
FIG. 14 is a cross-sectional, bottom view of the air distribution system illustrating airflow through the plurality of direct airflow channels and out of the first and second pair of direct air outlets in the "direct" mode.

As best illustrated in FIGS. 12-15, the air distribution system 20 includes a plurality of direct airflow channels 72, 74 and a plurality of indirect airflow channels 76 for guiding airflow from the air inlet 34 to the direct and indirect air outlets 54, 60, 70. The plurality of direct airflow channels 72, 74 includes a first set of direct airflow channels 72 each disposed adjacent one of the side walls 52 of the lower panel 30 and which extend from the air inlet 34 to a respective one of the first direct air outlets 54, and a second pair of direct airflow channels 74 which extend from the air inlet 34 to the second pair of direct air outlets 60. The first and second direct airflow channels 72, 74 are provided to establish direct airflow from the rear air conditioning unit to passengers situated in the second and third rows of the vehicle and proximate the plurality of direct air outlets 54, 60. FIGS. 14 and 16 illustrate an exemplary arrangement of this direct airflow by way of the direct airflow channels 54, 60.

Figure 15:
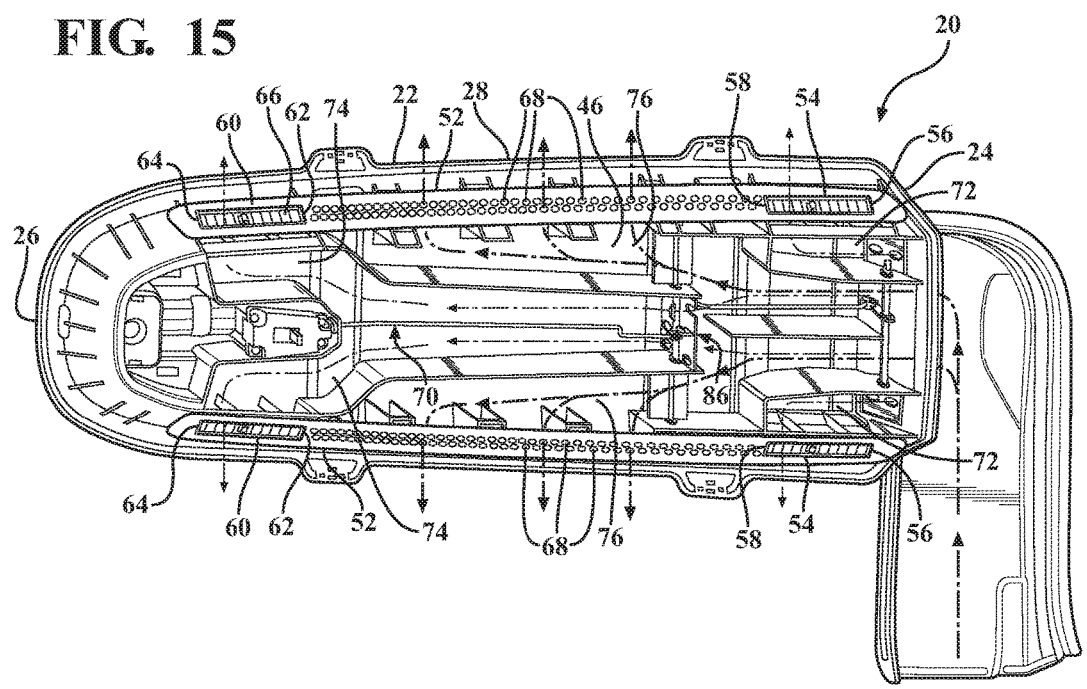
FIG. 15 is a cross-sectional, bottom view of the air distribution system illustrating airflow through the direct and indirect airflow channels and out of the direct and indirect air outlets in the "indirect" mode.

As best illustrated in FIGS. 2, and 9-10, the plurality of indirect airflow channels 76 extend from the air inlet 34 to the plurality of indirect air outlets 68 to establish an indirect airflow from the rear air conditioning unit to passengers situated in the second and third rows of the vehicle. FIGS. 15 and 17 illustrate an exemplary arrangement of the indirect airflow of the air distribution system 20.

In a preferred arrangement, the plurality of direct and indirect airflow channels 72, 74, 76 are defined by a plurality of ribs 78, 80, 82 which extend through the open space 32 of the housing 22. Accordingly, when the upper and lower panels 28, 30 are secured together, the plurality of ribs 78, 80, 82 divide the open space 32 into the direct and indirect channels 72, 74, 76 of the air distribution system 20. As best illustrated in FIGS. 2, 9, and 10, in a preferred arrangement, the plurality of ribs 78, 80, 82 extend downwardly from the top portion 46 of the upper panel 28. However, the plurality of ribs 78, 80, 82 could also extend upwardly from the base portion 48 of the lower panel 30 without departing from the scope of the subject disclosure. In a preferred arrangement, the plurality of ribs 78, 80, 82 include a first pair of ribs 78 which each extend from the air inlet 34 to the first front edge 58 of a respective one of the first pair of direct outlets 54 to define or form the first pair of direct airflow channels 54 disposed between the first pair of ribs 78. Accordingly, the first pair of direct airflow channels 54 extend from the air inlet 34 to the first pair of direct air outlets 54. The plurality of ribs 78, 80, 82 also include a second pair of ribs 80 which each extend from a position in general alignment with the first front edges 58 of the first pair of direct air outlets 54 to the second rearward edge 62 of a respective one of the second pair of direct outlets 60. The second pair of ribs 80 define or form the plurality of indirect airflow channels 76 each extending between the pair of second ribs 80 and the plurality of indirect air outlets 68. The plurality of ribs 78, 80, 82 also include a third pair of ribs 82 which extend from a position in general alignment with the second rearward edges 62 of the second pair of direct air outlets 60 to the second forward edge 64 of a respective one of the second pair of direct air outlets 60. The third pair of ribs 82 define or form the second pair of direct airflow channels 76 extending between the second pair of ribs 80 and the third pair of ribs 82, and terminating at the second pair of direct air outlets 60.

The air control assembly 70 includes an air blocking device 86 which is disposed within the plurality of direct and indirect airflow channels 72, 74, 76 and movable to establish the "direct" or first mode and the "indirect" or second mode of the air distribution system 20. As best illustrated in FIG. 12, when the air blocking device 86 is positioned to establish the "direct" or first mode, the air blocking device 86 opens the plurality of direct airflow channels 72, 74 and blocks the plurality of indirect airflow channels 76. As best illustrated in FIG. 13, when the air blocking device 70 is positioned to establish the "indirect" or second mode, the air blocking device 86 restricts flow through the plurality of direct airflow channels 72, 74 and opens airflow through the plurality of indirect airflow channels 76.

As best illustrated in FIGS. 12 and 13, in a preferred arrangement, the air blocking device 86 includes a pair of first direct air flaps 88 each disposed within one of the first pair of direct airflow channels 72, at least one second direct air flap 90 disposed within the plurality of second airflow channels 72, and a plurality of indirect air flaps 90 each disposed within one of the plurality of indirect airflow channels 76. As best illustrated in FIG. 12, when the air blocking device 86 is positioned to establish the "direct" or first mode, the first and second direct air flaps 88, 90 are positioned to extend along or parallel with the respective direct airflow channels 72, 74 to open airflow therethrough and the plurality of indirect air flaps 92 are positioned generally transverse to the plurality of indirect airflow channels 76 to block airflow therethrough. As best illustrated in FIG. 13, when the air blocking device 86 is positioned to establish the "indirect" or second mode, the first and second direct air flaps 88, 90 are positioned generally transverse to the respective first and second direct airflow channels 72, 74 to restrict airflow therethrough and the plurality of indirect air flaps 92 are positioned to extend along the plurality of indirect airflow channels 76 to open airflow therethrough.

As best illustrated in FIG. 13, when the air blocking device 86 is positioned to establish the "indirect" or second mode, the first and second direct air flaps 88, 90 restrict, but do not entirely block, airflow through the respective first and second direct airflow channels 72, 74. In a preferred arrangement, each of the first and second direct air flaps 88, 90 define a plurality of through-holes 94 to establish restricted, but not blocked, airflow in the "indirect" or second mode of the air distribution system. Put another way, as illustrated in FIGS. 15 and 17, the plurality of through-holes 94 facilitate a reduced or restricted volume of air through the first and second direct air flaps 88, 90 when they are disposed generally transverse to the respective direct airflow channels 72, 74. In an alternative arrangement, each of the first and second direct air flaps 88, 90 could be sized smaller than the respective direct airflow channels 72, 74 to allow restricted airflow around the first and second direct air flaps 88, 90.

Figure 11:
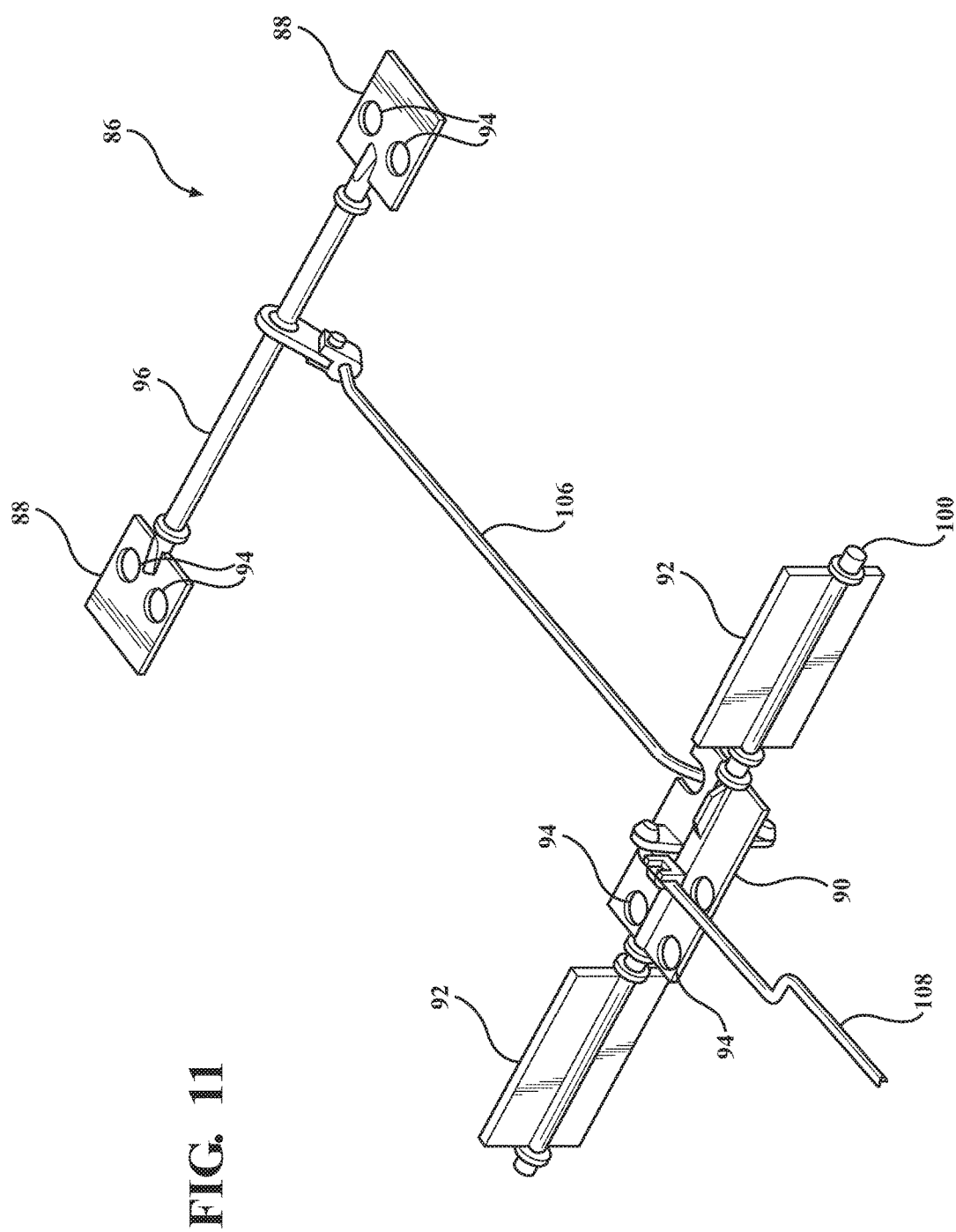
FIG. 11 is a perspective view of the air blocking device including a plurality of direct air flaps and a plurality of indirect air flaps.

As best illustrated in FIGS. 11, 12, and 13, the plurality of first direct air flaps 88 include a pair of first direct air flaps 88 each disposed in a respective one of the first direct airflow channels 72 adjacent the air inlet 34 and aligned in generally planar relationship to one another. The air blocking device 86 includes a first rod 96 which extends between and interconnects the pair of first direct air flaps 88 and is rotatable to pivot the pair of first direct air flaps 88 between their open and restricted positions. As best illustrated in FIG. 10, each of the first pair of ribs 78 define a first slot 98 and the first rod 96 is rotatably supported and rotatable in the first slots 98.

As best illustrated in FIGS. 12 and 13, the plurality of indirect air flaps 92 include a pair of indirect air flaps 92 each disposed adjacent a respective side wall 52 of the lower panel 30. The air blocking device 86 includes a second rod 100 which extends between and interconnects the pair of indirect air flaps 92 and is rotatable to move the pair of indirect air flaps 92 between their open and closed positions. Each of the second pair of ribs 80 define a second slot 102 disposed in aligned relationship to one another and the second rod 100 extends through and is rotatably supported by and rotatable within the second slots 102. Each of the indirect air flaps 92 extend from the second rod 100 in planar relationship to one another and the second direct air flap 90 is disposed between the pair of indirect air flaps 92 and extends from the second rod 100 in offset or transverse relationship to the pair of indirect air flaps 92. The second rod 100 is rotatable to collectively move the pair of first indirect air flaps 92 between their open and closed positions and the second direct air flap 90 between its open and restricted positions.

As best illustrated in FIGS. 3 and 4, the air control assembly 70 includes an airflow switch 104 is disposed on the lower panel 30 preferably in an area above the second row of seating in the vehicle and is switchable between a first or "direct" position and a second or "indirect" position. However, the airflow switch 104 could be provided at different locations within the vehicle, such as in a position where either the first or third row passengers could operate the airflow switch 104, without departing from the scope of the subject disclosure. The airflow switch 104 is operatively connected to the first and second rods 96, 100 such that the switching of the airflow switch 104 between the first and second position effectuates rotation of the first and second rods 96, 100 to establish the "direct" and "indirect" airflow modes of the air distribution system 20. For example, when the airflow switch 104 is disposed in the first or "direct" position, the first and second rods 96, 100 are rotated to position the pair of indirect flaps 92 such that they cover or block the plurality of indirect airflow channels 76 and position the first and second direct flaps 88, 90 such that they do not cover or restrict the plurality of direct airflow channels 72, 74. Therefore, all of the air emanating from the rear air conditioning unit is forced into and through the direct airflow channels 72, 74 and out the first and second pairs of direct air outlets 54, 60, such that the air is guided directly to the passengers in the second and third row seating. When the airflow switch 104 is disposed in the second or "indirect" position, the first and second rods 96, 100 are rotated to pivot or position the pair of indirect flaps 92 such that they no longer cover or block the plurality of indirect channels 76 and pivot or position now the first and second direct flaps 88, 90 such that they now restrict the plurality of direct airflow channels 72, 74. Thus, when the airflow switch 104 is in the "indirect" position, all of the air emanating from the rear air conditioning unit is moved into and through all of the indirect and direct channels 72, 74, 76 and out all of the direct air outlets 54, 60 and the indirect air outlets 68. Thus, the airflow is spread out generally across the length of the lower panel 30 such that the air is not specifically directed to the positioning of passengers in the second and third row seating, but rather a bloom of air is established above the second and third rows of the vehicle.

As best illustrated in FIGS. 9 and 11, in a preferred embodiment, the air blocking device 86 includes a third rod 106 which extends transversely between and is operatively connected to each of the first and second rods 96, 100 and a fourth rod 108 which extends transversely between and is operatively connected to the airflow switch 104 and the third rod 106. Accordingly, physical movement of the airflow switch 104 between the first and second positions effectuates rotation of the first and second rods 96, 100 by way of the third and fourth rods 106, 108. While the airflow switch is described as a manual switch which needs to be physically moved between the first and second positions by an occupant, it is to be understood that the airflow switch 104 could alternatively be operated by a push button configuration or in an electronic manner via a touchscreen on the dashboard or the like. Further, the airflow switch 104 could alternatively be a voice-activated switch, if desired.

While preferred embodiments of the present invention are shown and described, it is envisioned that those skilled in the art may devise various modifications of the present invention without departing from the spirit and scope of the invention. In other words, the subject disclosure it is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varies in many ways. Such variations are not to be regarded as a departure from the disclosure, and all such modifications are intended to be included within the scope of disclosure.

For example, while the air blocking device 86 is described and illustrated as using flaps 88, 90, 92 to close or block off airflow to the direct and indirect outlets 54, 60, 68, different blocking devices could alternatively be utilized instead if so desired. For instance, vents could be provided that are capable of being opened (such that air can flow therethrough) or closed (such that air is prevented from flowing therethrough). Furthermore, the air distribution system 20 could further be configured to prevent airflow through the plurality of direct and indirect outlets 54, 60, 68 provided through the side walls 52 by having the flaps or the like positioned adjacent the plurality of direct and indirect outlets 54, 60, 68 themselves, rather than at or near the air inlet 34 of the lower panel 30. Additionally, the plurality of indirect outlets could also be provided on the front wall portion 50 of the lower panel 30.

What is claimed is:

1. An air distribution system for the distribution of air conditioning to a rear portion of a vehicle, the air distribution system comprising:
    a housing extending from a first end to a second end;
    said housing defining a plurality of first direct air outlets disposed adjacent said first end and a plurality of second direct air outlets disposed adjacent said second end;
    said housing defining a plurality of indirect air outlets disposed between said plurality of first direct air outlets and said plurality of second direct air outlets; and
    an airflow control assembly configured to interchange airflow of the air distribution system between a first airflow mode wherein airflow is open through said the plurality of first and second direct air outlets but blocked from said plurality of indirect air outlets for guiding air directly to occupants situated adjacent said plurality of first and second direct air outlets and a second airflow mode wherein airflow is restricted through said plurality of first and second direct air outlets and open through said plurality of indirect air outlets to create airflow over the occupants.

2. An air distribution system for the distribution of air conditioning to a rear portion of a vehicle, the air distribution system comprising:
    a housing extending from a first end to a second end;
    said housing defining a plurality of first direct air outlets disposed adjacent said first end and a plurality of second direct air outlets disposed adjacent said second end;
    said housing defining a plurality of indirect air outlets disposed between said plurality of first direct air outlets and said plurality of second direct air outlets; and
    an airflow control assembly configured to interchange airflow of the air distribution system between a first airflow mode wherein airflow is open through said the plurality of first and second direct air outlets but blocked from said plurality of indirect air outlets for guiding air directly to occupants situated adjacent said plurality of first and second direct air outlets and a second airflow mode wherein airflow is restricted through said plurality of first and second direct air outlets and open through said plurality of indirect air outlets to create a airflow over the occupants;
    said housing defining an air inlet disposed at said first end;
    said housing defining a plurality of direct airflow channels each extending from said air inlet to one of said plurality of first or second direct air outlets;
    said housing defining a plurality of indirect airflow channels extending from said air inlet to said plurality of indirect air outlets; and
    said air control assembly configured to open said plurality of direct airflow channels and block said plurality of indirect airflow channels in said first airflow mode and restrict said plurality of direct airflow channels and open said plurality of indirect airflow channels in said second airflow mode to establish said bloom of air over the occupants.

3. An air distribution system as set forth in claim 2, wherein said air control assembly includes an air blocking device disposed within said plurality of direct and indirect airflow channels to establish said first and second airflow modes of the air distribution system.

4. An air distribution system as set forth in claim 3, further comprising:
    said air blocking device including a plurality of direct air flaps each disposed within one of said plurality of direct airflow channels and a plurality of indirect air flaps each disposed within one of said plurality of indirect airflow channels;
    said air blocking device movable between a first position wherein said plurality of direct air flaps each extend along a respective one of said plurality of direct airflow channels and said plurality of indirect air flaps each extend transverse to a respective one of said plurality of indirect airflow channels to a second position wherein said plurality of direct airflaps extend generally transverse to said plurality of direct airflow channels and said plurality of indirect air flaps each extend along a respective one of said plurality of indirect airflow channels.

5. An air distribution system as set forth in claim 4, wherein each of said plurality of direct air flaps define a plurality of through-holes to establish restricted but not blocked airflow through said plurality of direct air flaps for establishing said restricted airflow through said direct airflow channels in said second position of said air blocking device.

6. An air distribution system as set forth in claim 5, further comprising:
said housing including an upper panel and a lower panel interconnected with and disposed in spaced relationship with said upper panel to define an open space extending there between; and
said housing including a plurality of ribs extending through said open space to define said plurality of direct and indirect airflow channels.

7. An air distribution system as set forth in claim 6, wherein said air control assembly includes an airflow switch disposed on said lower panel and switchable to move said air blocking device between said first and second positions.

8. An air distribution system as set forth in claim 7, further comprising:
said upper panel including a top portion;
said lower panel including a base portion which extends in spaced and parallel relationship with said top portion to define said open space and a pair of side walls disposed on opposite sides of said base portion and which extend longitudinally between said first and second ends of said housing; and
said pair of side walls defining said plurality of direct and indirect air outlets.

9. An air distribution system as set forth in claim 8, further comprising:
said plurality of first direct air outlets including a first pair of direct air outlets each extending through one of said pair of side walls and disposed adjacent said first end in aligned relationship to one another;
said plurality of second direct air outlets including a second pair of direct air outlets each extending through one of said pair of side walls and disposed adjacent said second end in aligned relationship to one another;
said pair of side walls defining said plurality of indirect air outlets disposed between said first and second pairs of direct air outlets;
said plurality of direct air channels including a first set of direct airflow channels each disposed adjacent one of said side walls of said lower panel and extending from said air inlet to a respective one of said first direct air outlets and a second pair of direct airflow channels each extending from said air inlet to said second pair of direct air outlets; and
said plurality of indirect air channels extending from said air inlet to said plurality of indirect air outlets.

10. An air distribution system as set forth in claim 9, further comprising:
each of said pair of direct air outlets extending from a first rear edge to a first front edge;
each of said pair of indirect air outlets extending from a second rear edge to a second front edge;
said plurality of ribs including a first pair of ribs each extending from said air inlet to said first front edge of a respective one of said first pair of direct outlets to define said first pair of direct airflow channels;
said plurality of ribs including a second pair of ribs each extending from a position in alignment with said first front edges of said first pair of direct air outlets to said second rear edge of a respective one of said second pair of direct outlets to define said plurality of indirect airflow channels each extending between said pair of second ribs and said plurality of indirect air outlets; and
said plurality of ribs including a third pair of ribs each extending from a position in general alignment with said second rear edges of said second pair of direct air outlets to said second front edge of a respective one of said second pair of direct air outlets to define said second pair of direct airflow channels extending between said second pair of ribs and said third pair of ribs.

11. An air distribution system as set forth in claim 10, further comprising:
said plurality of direct air flaps including a pair of first direct air flaps each disposed in a respective one of said first direct airflow channels adjacent said air inlet and aligned in planar relationship to one another;
said plurality of indirect air flaps including a pair of indirect air flaps each disposed in a respective one of said indirect airflow channels adjacent a respective side wall and aligned in generally planar relationship to one another; and
said plurality of direct air flaps including a second direct air flap disposed between said pair of indirect air flaps in transverse relationship to said pair of indirect air flaps.

12. An air distribution system as set forth in claim 11, further comprising:
said air blocking device including a first rod extending between and interconnecting said pair of first direct air flaps;
said air blocking device including a second rod extending between said and interconnecting said pair of indirect air flaps;
said second direct air flap extending from said rod between said pair of indirect air flaps; and
said airflow switch configured to rotate said first and second rods to collectively pivot said direct and indirect air flaps and establish said first and second airflow modes of said air distribution system.

13. An air distribution system as set forth in claim 12, further comprising:
each of said first ribs defining a first slot for rotatably supporting said first rod; and
each of said second ribs defining a second slot for rotatably supporting said second rod.

14. An air distribution system as set forth in claim 12, further comprising:
said air blocking device including a third rod extending transversely between and operatively connected to each of said first and second rods and a fourth rod extending transversely between and operatively connected to said airflow switch and said third rod;
wherein movement of said airflow switch between said first and second positions effectuates said rotation of said first and second rods.

15. An air distribution system as set forth in claim 8, wherein said top portion of said air distribution system is disposed in overlaying relationship with a headliner.

16. An air distribution system as set forth in claim 8, wherein said top portion of said air distribution system is disposed in overlying relationship with a roof panel and the headliner overlays said upper panel to define said lower panel.

17. An air distribution system as set forth in claim 8, wherein said plurality of ribs extend downwardly from said top portion.

* * * * *